US010481035B2

(12) United States Patent
Laine et al.

(10) Patent No.: US 10,481,035 B2
(45) Date of Patent: Nov. 19, 2019

(54) METHOD FOR MEASURING PRESSURE DIFFERENCES BETWEEN DIFFERENT PREMISES IN A BUILDING

(71) Applicant: SI-TECNO OY, Helsinki (FI)

(72) Inventors: Seppo Laine, Helsinki (FI); Ville Voipio, Helsinki (FI)

(73) Assignee: SI-TECNO OY, Helsinki (FI)

( * ) Notice: Subject to any disclaimer, the term of this patent is extended or adjusted under 35 U.S.C. 154(b) by 0 days.

(21) Appl. No.: 15/528,542

(22) PCT Filed: Nov. 25, 2015

(86) PCT No.: PCT/FI2015/050822
§ 371 (c)(1),
(2) Date: May 22, 2017

(87) PCT Pub. No.: WO2016/083670
PCT Pub. Date: Jun. 2, 2016

(65) Prior Publication Data
US 2017/0268956 A1 Sep. 21, 2017

(30) Foreign Application Priority Data
Nov. 26, 2014 (FI) .................................. 20146037

(51) Int. Cl.
G01M 3/26 (2006.01)
F24F 7/06 (2006.01)
(Continued)

(52) U.S. Cl.
CPC .............. *G01M 3/26* (2013.01); *F24F 7/065* (2013.01); *F24F 11/0001* (2013.01);
(Continued)

(58) Field of Classification Search
CPC ........ F24F 11/77; F24F 11/0001; F24F 7/065; G01L 13/00; G01M 3/26
See application file for complete search history.

(56) References Cited

U.S. PATENT DOCUMENTS 3,402,654 A 9/1968 Berst
6,699,119 B2 * 3/2004 Boulanger ................ F24F 7/06
454/61
(Continued)

FOREIGN PATENT DOCUMENTS

EP 1 628 087 A1 2/2006
JP 59-9444 A 1/1984
(Continued)

OTHER PUBLICATIONS

Jae-Hun Jo et al., "Characteristics of pressure distribution and solution to the problems caused by stack effect in high-rise residential buildings," Building and Environment, 2007, pp. 263-277, vol. 42, No. 1.
(Continued)

*Primary Examiner* — Bryan Bui
(74) *Attorney, Agent, or Firm* — Sughrue Mion, PLLC

(57) ABSTRACT

A method for measuring pressure differences in different premises of a building, in which the pressure difference is measured using one or more sensors (2) that measure absolute pressure. The measurement results obtained from the sensors (2) are combined with information on the efficiency of the ventilation of the building, and the pressure difference caused by ventilation is mathematically separated from the measurement result by making use of information on the ventilation efficiency at any one time.

9 Claims, 9 Drawing Sheets

(51) Int. Cl.
    *F24F 11/00*     (2018.01)
    *F24F 11/77*     (2018.01)
    *G01L 13/00*     (2006.01)
    *F24F 110/40*     (2018.01)
    *F24F 7/00*     (2006.01)

(52) U.S. Cl.
    CPC .............. *F24F 11/77* (2018.01); *G01L 13/00* (2013.01); *F24F 2007/001* (2013.01); *F24F 2110/40* (2018.01)

(56) References Cited

U.S. PATENT DOCUMENTS

| | | | |
|---|---|---|---|
| 2003/0157882 A1* | 8/2003 | Boulanger | F24F 7/06 |
| | | | 454/256 |
| 2006/0236781 A1* | 10/2006 | Ohmi | G01F 1/42 |
| | | | 73/861.52 |
| 2007/0218823 A1 | 9/2007 | Wolf | |
| 2010/0161135 A1 | 6/2010 | Nerling | |
| 2012/0318073 A1 | 12/2012 | Zavodny et al. | |
| 2013/0245836 A1 | 9/2013 | Goodfellow | |
| 2013/0305814 A1 | 11/2013 | Menez et al. | |

FOREIGN PATENT DOCUMENTS

| | | |
|---|---|---|
| JP | 9-061282 A | 3/1997 |
| JP | 9-145517 A | 6/1997 |
| JP | 2001-91397 A | 4/2001 |
| JP | 2001-141598 A | 5/2001 |
| JP | 2004-157055 A | 6/2004 |
| JP | 3545855 B2 | 7/2004 |
| JP | 2010-071950 A | 4/2010 |

OTHER PUBLICATIONS

Written Opinion of the International Searching Authority for PCT/FI2015/050822, dated Mar. 2, 2016 (PCT/ISA/237).

Communication of Finish Application No. 20146037 dated Jun. 2, 2015.

International Search Report of PCT/FI2015/050822, dated Mar. 2, 2016 (PCT/ISA/210).

Communication dated Jun. 22, 2018 (dated Jul. 4, 2018) from the European Patent Office in counterpart Application No. 15 86 4180.

* cited by examiner

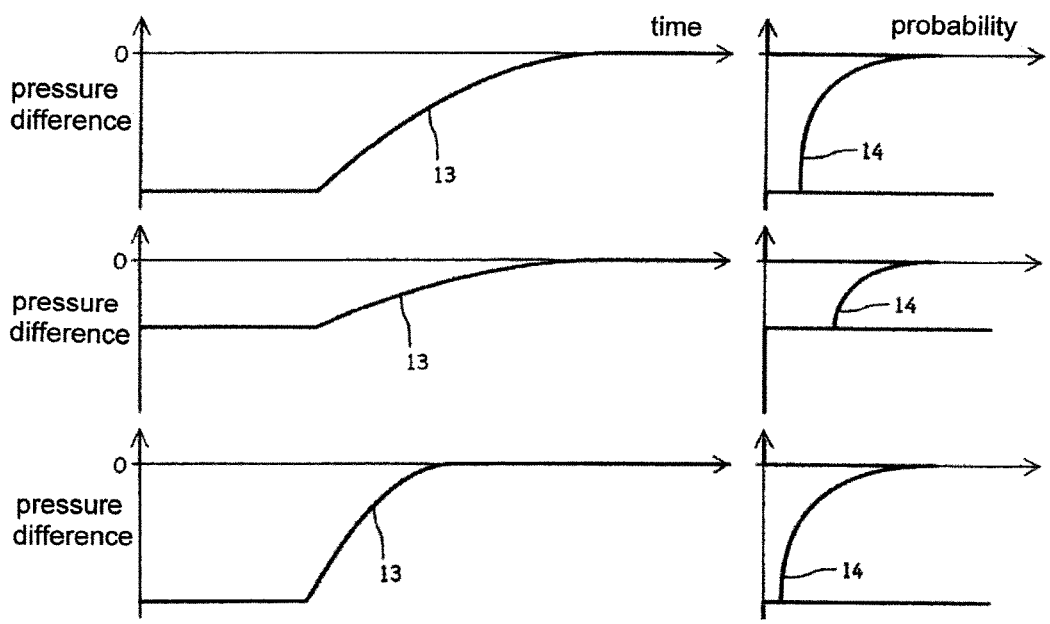

METHOD FOR MEASURING PRESSURE DIFFERENCES BETWEEN DIFFERENT PREMISES IN A BUILDING

CROSS REFERENCE TO RELATED APPLICATIONS

This application is a National Stage of International Application No. PCT/FI2015/050822 filed Nov. 25, 2015, claiming priority based on Finish Patent Application No. 20146037, filed Nov. 26, 2014, the contents of all of which are incorporated herein by reference in their entirety.

BACKGROUND

Field of the Invention

The invention relates to a method for measuring pressure differences in different premises of a building, in which the pressure difference is measured by means of one or more sensors that measure absolute pressure.

The invention relates to building automation systems, in particular to ventilation of buildings.

Related Art

From prior art is known a technology for measuring pressure differences between different parts of buildings with two-port pressure difference meters. These measuring instruments usually feature two hoses or ducts through which air pressure is led to the measuring element from the premises being measured, such as from the outside and inside of a building. This may also be implemented in such a manner that the measuring element is located in one of the premises being compared, whereby one channel, only, is needed for the pressure. The main difficulty in prior art is its inconvenient installation; in particular carrying out its installation in an existing building is difficult. Furthermore, the pressure channels may require regular maintenance.

Measuring pressure differences may also be performed by the use of two measuring elements that measure absolute pressure, and by subtracting their measurement results from each other. This arrangement is obvious for a person skilled in the art. This type of measuring is, however, associated with numerous practical problems. As examples of the problems, long-term instability of the measuring elements, required high measuring accuracy, and the pressure differences caused by installing the measuring instruments at different heights may be mentioned. The sources of error relatrelated to absolute sensors are caused by the required high dynamics, because in practice the required measuring accuracy is in the order of 1 Pa (pascal), and the prevailing air pressure is in the order of 100 000 Pa. Therefore a solution which replaces two-port pressure difference meters or similar with sensors measuring absolute pressure will not result in a feasible solution.

SUMMARY

An object of the invention is to provide a measuring arrangement which enables prior art drawbacks to be eliminated. This is achieved by the invention. The method according to the invention is characterised by combining measurement results obtained from sensors with information on the efficiency of the ventilation of a building, and by mathematically separating the pressure difference caused by ventilation from the measurement result by making use of information on the ventilation efficiency at any one time.

So, the invention utilizes measuring the pressure difference by a sensor that measures absolute pressure in such a manner that the pressure difference created by ventilation is mathematically separated from the measurement results by making use of information on the ventilation efficiency at any one time. Instead of measurement information, the basic idea of the invention also makes it possible to actively control the ventilation efficiency.

The advantage of the invention is that accurate measurement information is obtained for effective control of the ventilation process, whereby ventilation may be effectively controlled. A further advantage of the invention is that the invention may be adapted in an advantageous manner, that is, the installation and use of the required measuring sensors do not generate great costs.

BRIEF DESCRIPTION OF THE DRAWINGS

In the following, the invention will be explained in closer detail by means of the figures in the attached drawing, in which FIG. 9 shows schematic examples of different distributions produced by different changes.

DETAILED DESCRIPTION OF THE INVENTION

Figure 1:
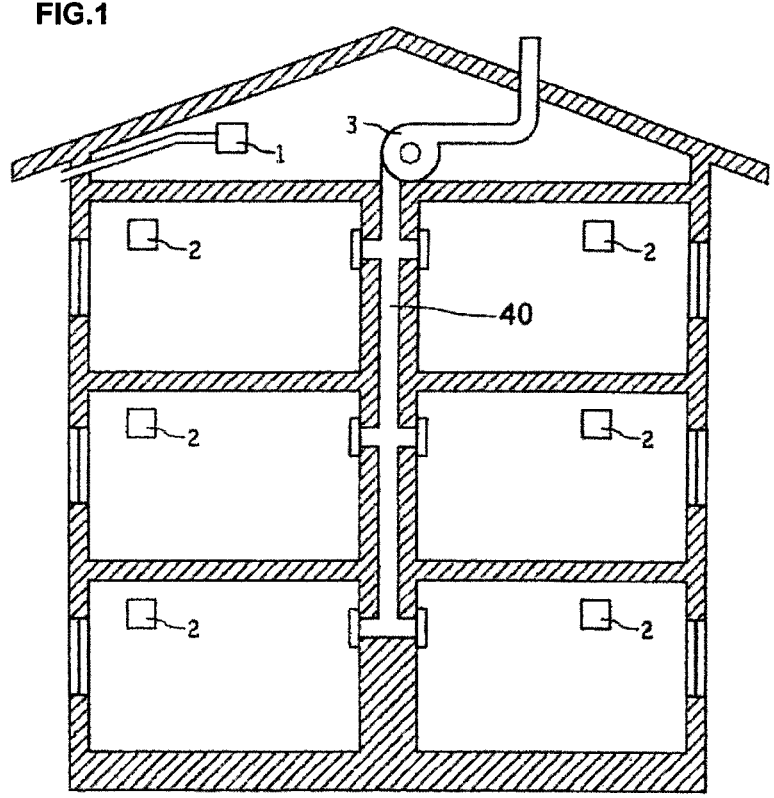
FIG. 1 shows a schematic view of a building in which a measuring arrangement applying the method according to the invention is used.

FIG. 1 is a schematic view of a building where a measuring arrangement applying the method of the invention is used. FIG. 1 shows schematically a situation where the pressure difference between the outdoor air and the interior is measured. The arrangement has a reference sensor 1 measuring the absolute outdoor pressure, sensors 2 measuring the absolute pressures of the interior, as well as a ventilation device 3 which in this case removes air from the building through a ventilation duct 40 leading to the rooms.

The example of FIG. 1 shows a ventilation device. The ventilation device is, however, not an essential issue from the point of views of the invention, although a ventilation device is, in practice, almost always present. From the viewpoint of the invention, it is essential that ventilation can be measured and that ventilation either varies adequately on its own, or that it can be adjusted. By measuring or adjusting variation, such variation is achieved which can be mathematically separated from the signal of the absolute meters. In the following, the invention will be described in greater detail by means of the example of FIG. 1.

Figure 2:
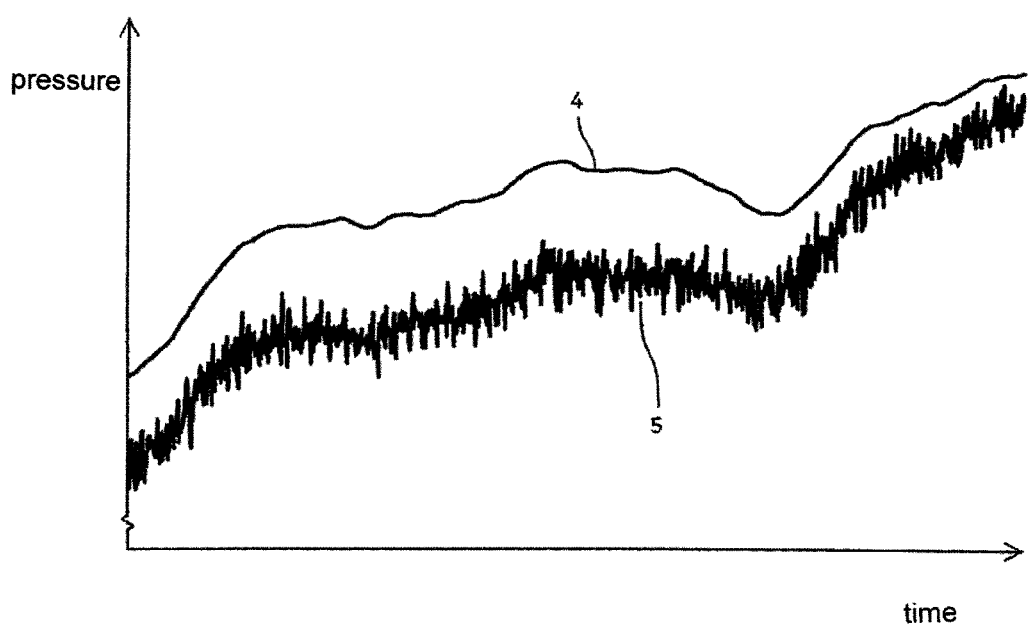
FIG. 2 shows a schematic view of the actual air pressure and a typical output signal from a measuring instrument.

Typically, the measuring signal of an absolute pressure measurement is associated with a plurality of error sources. Measurements include constant error due to, for example, matters related to individual measuring instruments. A measurement result additionally has random noise, and the measurement result is not stable over a long-term period. This is described in FIG. 2, which shows the actual air pressure 4 and a typical output signal 5 from a measuring instrument.

Figure 3:
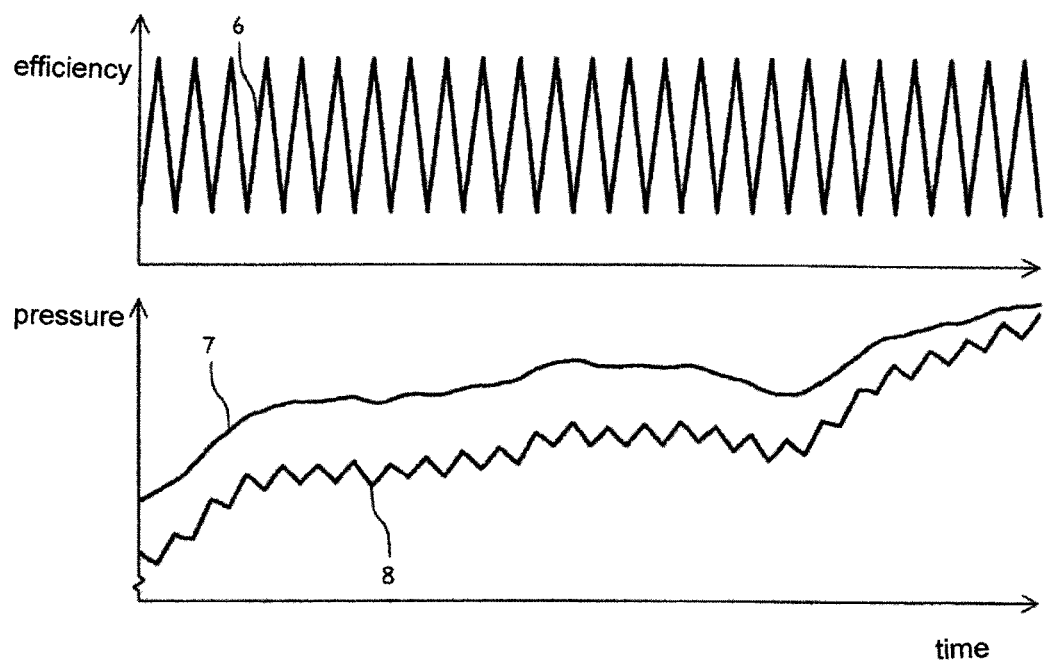
FIG. 3 is a schematic representation of a situation where the efficiency of a ventilation device is varying.

FIG. 3 shows, with the aid of a schematic example, a situation where the efficiency of a ventilation device 6 is varying. The efficiency of a ventilation device may here be understood to refer to any repeatable variable that measures the amount of ventilation, such as the electrical input power of a fan, the amount of air passing in a duct, or pressure difference across the ventilation device. Efficiency variation will not be evident in results 7 of the sensor measuring outdoor pressure, but shows in results 8 of the sensor measuring indoor air pressure. The results from the sensors should be uniform when the efficiency of the ventilation device is zero, but due to the installation height, long-term instability of the sensors, and different initial error this is not realized. Despite this, the effect of ventilation on the pressure difference is mathematically separable by using correlation methods, for example. For reasons of clarity, random noise referred to in the above has been left out of the measurement results.

The use of the measurement results 7 produced by a reference sensor 1 makes the mathematical processing of the results easier, because one major source of measurement result variation is made known. However, the use of a reference sensor is not imperative from the viewpoint of the invention, because the response of different premises to ventilation changes may be determined by comparing the pressure in a single premises to the average of the measurement results of all or a plurality of sensors, or to another similar statistical variable. Pressure changes in outdoor air pressure affect all the sensors in the same way, whereby this common component may be removed. This allows the definition of how ventilation affects each of the single premises.

The separation of the aforementioned practical error sources from the changes in measurement results caused by changes in ventilation may, in addition to temporal correlation, be based on utilizing the characteristics of the frequency range of the error sources. Random noise is typically evenly distributed on the whole frequency range, whereby it may be reduced by filtering the measurement signal with a low-pass filter. An advantageous way to implement the low-pass filtering is to average more than one measurement results. In this case, the time scale used is typically seconds or minutes.

The long-term instability of the measurement device, in its turn, is a slow phenomenon the time scale of which typically ranges from days to years. This phenomenon may be clearly distinguished from the pressure changes caused by changes in ventilation, if the pressure changes caused by ventilation are faster than this. In the compensation of a slow phenomenon, it is in some cases also advantageous to assume that the change in a shorter period of time is linear.

A most advantageous practical way to implement the arrangement is one where the efficiency of the ventilation device is controlled by a control unit which also gathers the measurement information of the indoor premises and reference sensor. The control unit switches the ventilation off once a day, for example, whereby the pressure difference between premises will even out, as known. In such a case, the measurement signal generated by the indoor sensors may be reset with respect to the signal generated by the outdoor sensor.

Figure 4:
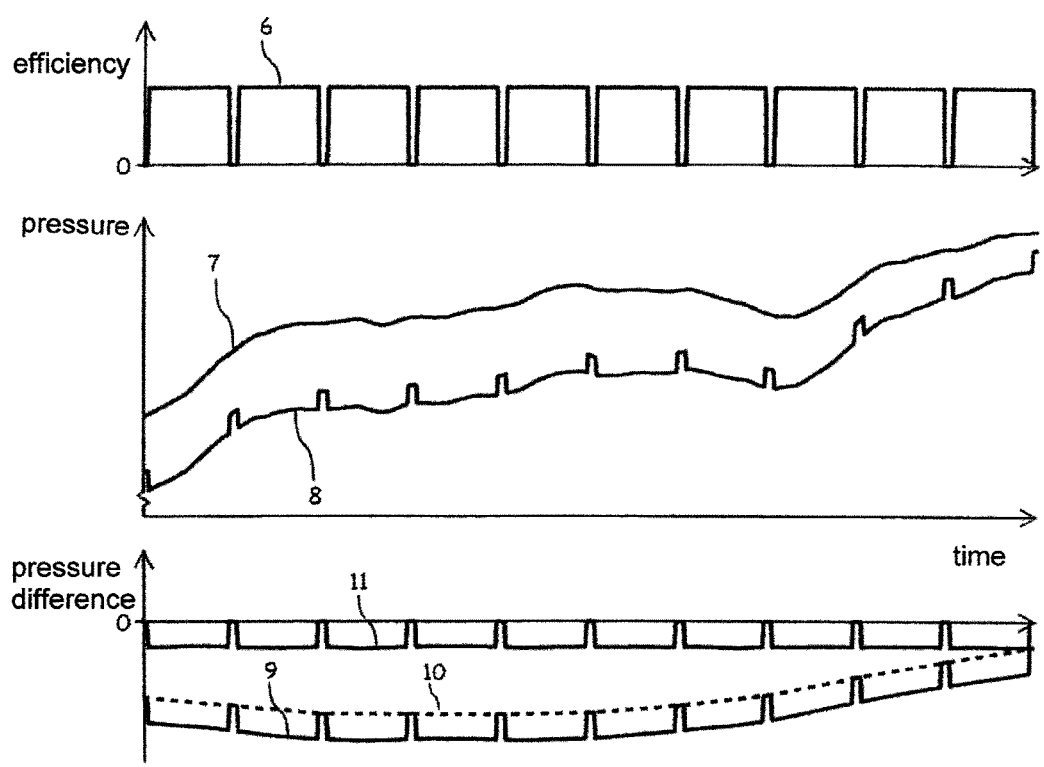
FIG. 4 is a schematic view of the efficiency of a ventilation device as well as the measured and corrected pressures in the situation in question.

FIG. 4 shows the ventilation efficiency and the measured pressures for this embodiment. The efficiency 6 of the ventilation device is at a constant level most of the time, but it is periodically switched off completely. The outdoor pressure 7 is still independent of the ventilation, and the indoor air pressure 8 reflects the ventilation operation so that the actual pressure difference is zero when the ventilation device is not in use. By subtracting the outdoor pressure measurement 7 from the pressure measurement 8 for the indoor air in the indoor premises, an uncorrected pressure difference 9 will be obtained, indicating the instability of the measurement signal. Instability is corrected by a correction 10 which is calculated on the basis of the resetting moments, and which is calculated here as a linear interpolation between the resetting moments. The correction 10 may be calculated by numerous other known interpolation methods, too. The final pressure difference information 11 is obtained by subtracting the correction 10 determined on the basis of the zero points from the difference 9 of the pressure results of the pressure measurement devices.

Buildings, in practice, have numerous disturbance factors that may momentarily change the air pressure balance of the building. These include, for example, opening of a single window, which in practice clears the pressure difference between outdoor and indoor air. Because these error sources may be considered temporary and random by nature in determining a longer-term pressure balance, various kinds of filtering methods may be applied to remove them.

Figure 5:
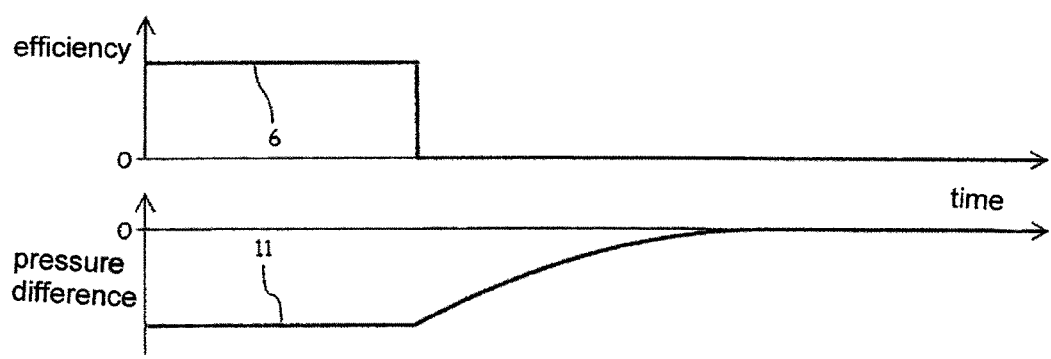
FIG. 5 is a schematic view of a situation where a ventilation device is very abruptly switched off, and where the air pressure in the indoor premises becomes even with the air pressure outside.

If the changes in ventilation efficiency are fast by nature, the change in the air pressure after the change in efficiency may be used to determine leakage air flow rates. FIG. 5 shows a situation where ventilation 6 is very quickly switched off. In such a case, the air pressure of the indoor premises seeks balance with the outdoor air pressure 7 with a delay, whereby the difference 11 between the air pressures aims for zero. The amount of delay combined with information on the volume of the indoor premises makes it possible to determine air flow absolutely in the units L/s, for example, because the amount of air in the premises may be calculated with the aid of the volume and absolute pressure. As a result, the invention makes it possible to measure absolute air flow in different pressure situations. Because the invention also enables measuring air pressure differences, it may be used to determine the ventilation of premises as a whole.

It is worth noting that making such a calculation does not require ventilation to be closed down entirely, but any known efficiency change taking place in an adequately short period of time makes it possible to calculate a change in the air flow, because the calculation is based on dynamic examination of the pressure difference in the change situations.

Figure 6:
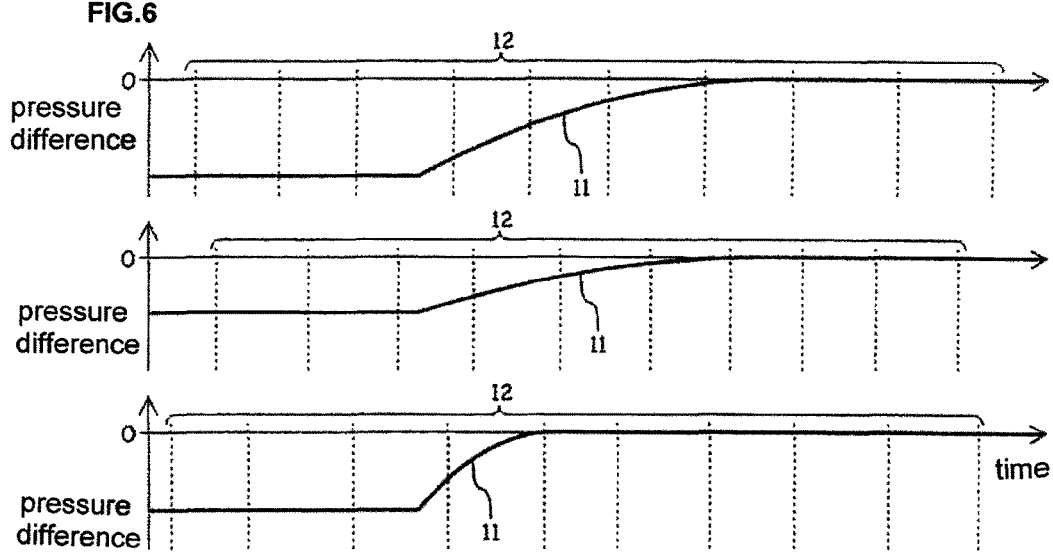
FIG. 6 is a schematic view of a situation where the differences in air pressure in the premises that are being measured dynamically change while the sampling moments are out of phase both mutually and with respect to air pressure variation.

An advantageous method for implementing the arrangement is to use a wireless measurement network in which wireless measurement sensors schedule their operation by themselves. The cost-effectiveness of the arrangement stems from its low consumption of electrical power and ease of installation. A difficulty associated with the arrangement is that, for phenomena shorter than the measurement interval, no time series that could be timed can be obtained, resulting in that the dynamic characteristics of a change cannot be calculated directly. FIG. 6 shows a situation where the differences 11 in air pressure in the premises that are being measured dynamically change while the sampling moments 12 of the measurement sensors in different premises are out of phase both mutually and with respect to air pressure variation.

Figure 7:
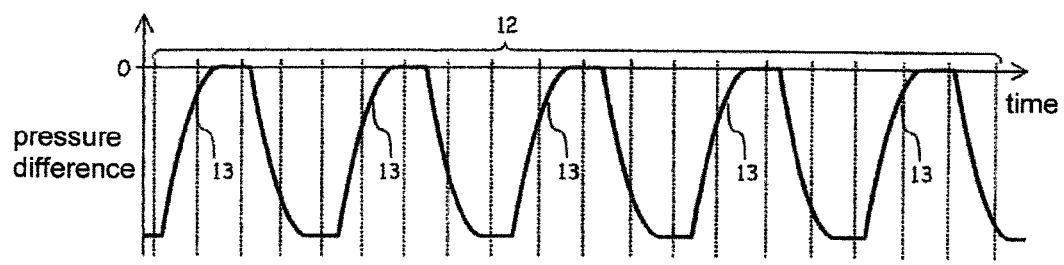
FIG. 7 is a schematic view of a situation where there is a large number of similar changes in air pressure, and where the sampling moments occur randomly in relation to the changes.

It is obvious that in the situation of FIG. 6 it is not possible to determine the dynamic behaviour of air pressure from a single measurement in a change situation. According to the invention, however, there is a large number of changes in air pressure, such as once a day, for example, whereby the dynamic behaviour may also be determined from samples takes at random moments. FIG. 7 is shows a situation where there is a large number of similar changes 13 in air pressure, and where the sampling moments 12 occur randomly with respect to these changes.

Figure 8:
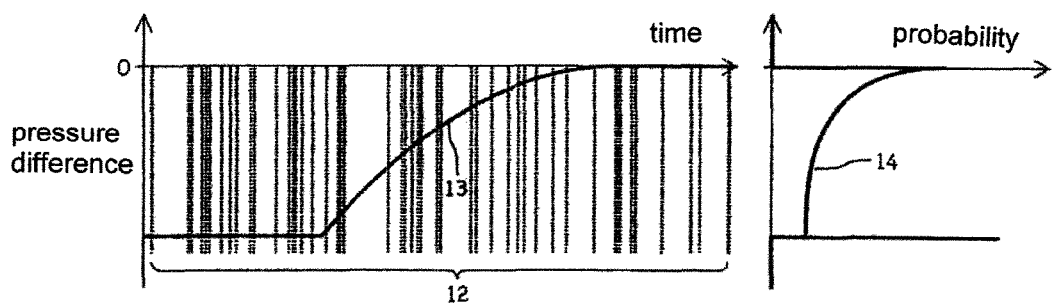
FIG. 8 is a schematic view of the situation of FIG. 7 with the changes in air pressure drawn one on the other, whereby the sampling moments occur as a random group.

The situations may be described as in FIG. 8 also by drawing the air pressure changes 13 one on the other whereby the sampling moments 12 occur as a random group on the range of the air pressure changes. When there is a large number of obtained samples, a statistical distribution 14 may be fashioned out of them.

FIG. 9 shows examples of how different changes 13 produce different distributions 14. Since it is known that a change is monotonous, the shape of the distribution makes it possible to calculate the shape of the original change event. For example, a shorter change time produces a lower distribution, and the shape of the distribution reflects the inverse of the change rate of the pressure at each pressure difference level.

The invention is described above by means of application examples shown in the figures. The invention is not, however, restricted to the examples of the figures in any way, but the invention may be varied entirely freely within the scope of the claims. The figures in the drawings must be seen as examples of the principle, which do not show detailed structures or mathematical results.

The invention claimed is:

1. A method for measuring pressure differences in a building, comprising:
    establishing, in a premise of the building, at a first instant of time, a first pressure with a ventilation device of the building,
    measuring, at said first instant of time, a pressure in the premise by one sensor that measures absolute pressure,
    adjusting and changing an efficiency of the ventilation device and establishing in the premise, at a second instant of time, a second pressure,
    measuring, at said second instant of time, a pressure in the premise with said one sensor, and
    combining the pressure measured at said first instant of time and the pressure measured at said second instant of time, with information on the change of the efficiency of the ventilation device of the building at the first and second instants of time, respectively, to obtain pressure difference information as response to the change of the efficiency of the ventilation device.

2. The method as claimed in claim 1, further comprising actively controlling the efficiency of the ventilation device.

3. The method as claimed in claim 2, further comprising controlling the efficiency of the ventilation device by means of a control unit, the control unit also gathering measurement information of the sensors.

4. The method as claimed in claim 1, further comprising using a reference sensor that measures absolute outdoor pressure for obtaining the pressure difference information.

5. The method as claimed in claim 1, further comprising using a plurality of or all of the sensors as reference sensors for obtaining the pressure difference information.

6. The method as claimed in claim 1, further comprising periodically switching off the ventilation device completely.

7. The method as claimed in claim 1, in which the pressure measurement information is obtained by subtracting outdoor pressure measurement information from indoor pressure measurement information, which produces an uncorrected pressure difference information,
    further comprising correcting an instability evidenced by the uncorrected pressure difference information by a correction calculated on the basis of the resetting moments obtained from the efficiency change of the ventilation device, and by obtaining a final pressure difference information by subtracting a correction, determined on the basis of the resetting moments, from the uncorrected pressure difference information.

8. The method as claimed in claim 1, further comprising using pressure change taking place after a fast efficiency change of the ventilation device for calculating leakage air flow rates by determining a delay in the evening out of the difference of the air pressures in indoor premises and outdoors, combining the delay into information on volume of the indoor premises of the building, and defining, on the basis of the information in question, the amount of airflow per a time unit.

9. The method as claimed in claim 8, further comprising gathering a large amount of pressure change information taking place as a result of fast efficiency changes of the ventilation device and obtained at different times, and forming, out of the information, a statistical distribution by means of which the amount of air flow is determined per a time unit.

* * * * *